(12) United States Patent
Lieu

(10) Patent No.: US 10,771,417 B2
(45) Date of Patent: *Sep. 8, 2020

(54) CONTROL OF MESSAGES IN PUBLISH/SUBSCRIBE SYSTEM

(71) Applicant: International Business Machines Corporation, Armonk, NY (US)

(72) Inventor: Hanson Lieu, Milton Keynes (GB)

(73) Assignee: International Business Machines Corporation, Armonk, NY (US)

( * ) Notice: Subject to any disclaimer, the term of this patent is extended or adjusted under 35 U.S.C. 154(b) by 11 days.

This patent is subject to a terminal disclaimer.

(21) Appl. No.: 16/243,272

(22) Filed: Jan. 9, 2019

(65) Prior Publication Data

US 2019/0149498 A1 May 16, 2019

Related U.S. Application Data

(63) Continuation of application No. 15/143,648, filed on May 2, 2016, now Pat. No. 10,257,138, which is a (Continued)

(51) Int. Cl.
*H04L 12/58* (2006.01)
*G06F 9/00* (2006.01)
*H04L 29/08* (2006.01)

(52) U.S. Cl.
CPC .............. *H04L 51/066* (2013.01); *G06F 9/00* (2013.01); *H04L 51/18* (2013.01); *H04L 67/306* (2013.01)

(58) Field of Classification Search
CPC ............................ H04L 51/066; H04L 51/18
See application file for complete search history.

(56) References Cited

U.S. PATENT DOCUMENTS 5,870,605 A    2/1999   Bracho et al.
6,957,233 B1   10/2005   Beezer et al.
(Continued)

FOREIGN PATENT DOCUMENTS

CN      101056190 A    10/2007
CN      103562890 A     2/2014

OTHER PUBLICATIONS

Zhiguo Gong, "Efficient Filtering Algorithms for Location-Aware Publish/Subscribe," IEEE Transactions on Knowledge and Data Engineering, Last Printed on Mar. 5, 2015, 2 pages, Copyright © 2015 IEEE.

(Continued)

*Primary Examiner* — Umar Cheema
*Assistant Examiner* — James Ross Hollister
(74) *Attorney, Agent, or Firm* — Nicholas D. Bowman

(57) ABSTRACT

Control of messages in a publish/subscribe system is described. A publishing system creates a message for publishing to multiple subscribers via a broker system. The message and associated metadata are provided. The metadata defines control of the message and relates to control of publishing of the message, by the broker system, and/or control of use of the message, by a subscribing system. The message is published with the metadata. A broker system receives the message and analyses the metadata with respect to a subscriber. Based on the analysis, restrictions are applied to delivery of the message to the subscriber. A subscribing system receives the message and analyses the metadata with respect to the subscriber. Based on this second analysis, restrictions are applied to use of the message by the subscriber.

10 Claims, 8 Drawing Sheets

Related U.S. Application Data continuation of application No. 14/792,759, filed on Jul. 7, 2015, now Pat. No. 10,447,626.

(56) References Cited

U.S. PATENT DOCUMENTS

| | | |
|---|---|---|
| 7,209,948 B2 | 4/2007 | Srinivasa |
| 7,370,269 B1 | 5/2008 | Prabhu et al. |
| 7,373,590 B2 | 5/2008 | Woolf et al. |
| 7,890,489 B2 | 2/2011 | Stewart et al. |
| 8,495,160 B2 | 7/2013 | Fletcher et al. |
| 8,635,520 B2 | 1/2014 | Christiansen et al. |
| 8,706,685 B1 | 4/2014 | Smith et al. |
| 8,868,661 B2 | 10/2014 | Asawa et al. |
| 9,237,202 B1 | 1/2016 | Sehn |
| 9,832,149 B2 | 11/2017 | Uraizee et al. |
| 10,146,757 B2 | 12/2018 | Lieu |
| 2002/0120697 A1 | 8/2002 | Generous et al. |
| 2003/0208539 A1 | 11/2003 | Gildenblat et al. |
| 2004/0237033 A1 | 11/2004 | Woolf et al. |
| 2005/0262051 A1 | 11/2005 | Dettinger et al. |
| 2006/0126621 A1* | 6/2006 | Bedi ................ H04L 12/1859 370/389 |
| 2008/0098294 A1 | 4/2008 | Le |
| 2008/0134202 A1 | 6/2008 | Craggs et al. |
| 2008/0215744 A1* | 9/2008 | Shenfield .......... H04L 67/2804 709/231 |
| 2009/0106271 A1 | 4/2009 | Chieu et al. |
| 2009/0164301 A1* | 6/2009 | O'Sullivan ............ G06Q 30/02 705/14.49 |
| 2009/0327855 A1 | 12/2009 | Le |
| 2010/0023587 A1* | 1/2010 | Fletcher .............. H04L 12/1859 709/206 |
| 2011/0154180 A1 | 6/2011 | Evanitsky et al. |
| 2011/0173214 A1 | 7/2011 | Karim |
| 2011/0320550 A1* | 12/2011 | Lawson ................ H04L 51/04 709/206 |
| 2012/0041822 A1* | 2/2012 | Landry ............. G06Q 30/0261 705/14.58 |
| 2012/0209924 A1* | 8/2012 | Evans .................... H04L 63/08 709/206 |
| 2012/0215872 A1 | 8/2012 | Beardsmore et al. |
| 2013/0031453 A1 | 1/2013 | Griffiths et al. |
| 2013/0080916 A1 | 3/2013 | Lopez et al. |
| 2013/0091295 A1 | 4/2013 | Meijer et al. |
| 2014/0236808 A1 | 8/2014 | Bilynsky |
| 2014/0310305 A1 | 10/2014 | Christiansen et al. |
| 2014/0344314 A1 | 11/2014 | Gray-Donald et al. |
| 2015/0139610 A1 | 5/2015 | Syed et al. |
| 2016/0063087 A1 | 3/2016 | Berson et al. |
| 2016/0112438 A1* | 4/2016 | Hengstler ............... H04L 51/12 726/4 |
| 2017/0011021 A1 | 1/2017 | Lieu |
| 2017/0012909 A1 | 1/2017 | Lieu |
| 2017/0012916 A1 | 1/2017 | Lieu |
| 2017/0012993 A1 | 1/2017 | Lieu |
| 2017/0060829 A1 | 3/2017 | Bhatt |

OTHER PUBLICATIONS

Oracle, "JMS Message Selectors," The Java EE 6 Tutorial, Last Printed on Jun. 23, 2015, 1 page, © 2010, Oracle Corporation and/or its affiliates, https://docs.oracle.com/cd/E19798-01/821-1841/bncer/index.html.

Gulati, R., "View and Annotate Documents Online with GroupDocs' Document Management Apps," Groupdocs Your Document Collaboration APIs, Sep. 20, 2013, Last Printed on Jun. 23, 2015, 5 pages, © GroupDocs—A division of Aspose. All Rights Reserved.

IBM, "IBM Daeja ViewONE", printed Jul. 9, 2018, 3 pages, https://www.ibm.com/us-en/marketplace/ibm-daeja-viewone.

Lieu, H., "Control of Messages in Publish/Subscribe System", U.S. Appl. No. 16/243,259, filed Jan. 9, 2019.

IBM, List of IBM Patents or Patent Applications Treated as Related, Jan. 9, 2019, 2 pages.

* cited by examiner

FIG. 3C

SUBSCRIBING SYSTEM 130

SUBSCRIBING COMPONENT 338

MESSAGE RECEIVING COMPONENT 331

MESSAGE 1 111

METADATA 150
- FOR PUB 151
- FOR SUB 152

METADATA COMPONENT 332

METADATA ANALYZING COMPONENT 333

SUBSCRIBER INFO COMPONENT 334

METADATA APPLYING COMPONENT 335

MESSAGE RE-PUBLISHING COMPONENT 336

MESSAGE AMENDING COMPONENT 337

METADATA AMENDING COMPONENT 339

CONTROL OF MESSAGES IN PUBLISH/SUBSCRIBE SYSTEM

BACKGROUND

The present disclosure relates to publish/subscribe messaging, and more specifically, to providing control of messages in a publish/subscribe system.

The ability to publish and subscribe to information based on the topic and content is quite prevalent; however, the ability to have fine grain control over what messages are sent, received and their retention is more limited. It is especially difficult to control the use of a message when a message has already been sent to the subscriber.

There is a need to control not only what can be published and subscribed to but the information that is retained by the subscriber.

There is also a need to allow a subscriber to be able to send information back to a publisher about a message.

Therefore, there is a need in the art to address the aforementioned problems and needs.

SUMMARY

According to embodiments, a first aspect of the present invention includes a method for control of messages in a publish/subscribe system, as carried out at a publishing system. As part of the method, the publishing system creates a message for publishing to multiple subscribers via a publish/subscribe broker system. Metadata associated with the message is provided. The metadata, which is to be published with the message, defines control of the message. More specifically, the metadata relates to control of the publishing of the message to a subscriber, as applied by the publish/subscribe broker system based on the metadata, and/or control of the use of the message, as applied by a subscribing system based on the metadata. The message is published with the metadata.

In an embodiment, this first aspect has the advantage of enabling the publishing user to control the publishing of a message and/or the end use of a message by a subscriber. The control of the end use of the message may include control of editing and re-publishing of the message.

In an embodiment, the metadata may include a look up marker configured to cause a look up action to retrieve information indicated by the look up marker, such that control or use of a message varies across subscribers based on the looked up information for each subscriber. In an embodiment, this may enable metadata to be used to define control or use of a message according to a value that is determined for a subscriber when the look up is carried out for that subscriber. This may mean that the information, and therefore the use rights, may vary depending on the subscriber. A single message with associated metadata may have a varying delivery or use restrictions depending on the subscriber. In one embodiment, the looked up information is the location of each subscriber and the look up marker defines control which applies differently in different locations.

In an embodiment, the metadata may control the metadata itself by defining if the metadata is for control of the publishing of the message and/or if the metadata is for control of the use of the message by the subscriber receiving the message. The associated metadata may use other metadata that is defined. For example, this may include control of "editable" metadata based on location metadata and subscriber filter information, such as age range and location.

In an embodiment, the method further includes subscribing the publishing system to updates of the message provided by subscribing systems. These updates may include associated metadata provided by subscribing users.

In an embodiment, defined restrictions relating to control of the message may include one or more of a group consisting of: defining a time of availability of the message; defining a subscriber location; defining when the subscriber meets a criterion; defining a property of the message; defining a scope of access to the message based on subscriber characteristics; and defining a type of subscriber.

In an embodiment, the metadata may include headline information for use by the broker system in advertising messages to subscribers.

According to embodiments, a second aspect of the present invention includes a method for control of messages in a publish/subscribe system, as carried out at a broker system or a subscribing system. As part of the method, a published message with associated metadata is received. This metadata defines control of the publishing of the message, to be applied by a publish/subscribe broker system, and/or defines control of the use of the message, to be applied by a subscribing system. The metadata associated with a message is analyzed with respect to a subscriber. Based on the analysis, restrictions are applied to the delivery of the message to the subscriber and/or the use of the message by the subscriber.

In one embodiment, the method is carried out at a broker system. As part of the method, the received metadata is applied by the broker system to define the control of the publishing of the message. The broker system analyzes the metadata with respect to a subscriber and then applies the restrictions derived from the metadata to the delivery of the message to the subscriber.

In another embodiment, the method is carried out at a subscribing system. As part of the method, the received metadata is applied by the subscribing system to define control of the use of the message by a subscriber at the subscribing system. The subscribing system analyzes the metadata with respect to the subscriber and then applies the restrictions derived from the metadata to the use of the message by the subscriber.

In an embodiment, analyzing the metadata may include identifying a look up marker and carrying out a look up action to retrieve the information for the look up marker, such that control or use of a message varies across subscribers based on the looked up information for each subscriber. Analyzing the metadata may also include obtaining details of a subscriber and applying the metadata to the subscriber.

In an embodiment, the method, when carried out at a broker system, may include forwarding at least a subset of the metadata associated with the message to a subscriber, wherein at least some of that subset of the metadata defines control of the use of the message to be applied by the subscribing system with respect to the subscriber.

In an embodiment, the method, when carried out at a subscribing system, may include amending the message, amending the associated metadata, and re-publishing the amended message and the amended associated metadata to the message publisher.

According to embodiments, a third aspect of the present invention includes a publishing system for control of messages in a publish/subscribe system. The publishing system includes a message creating component for creating a message for publishing to multiple subscribers via a publish/subscribe broker system. The publishing system further includes a metadata creating component for providing metadata associated with the message. The metadata, which is to be published with the message, defines control of the message. More particularly, the metadata relates to control of the publishing of the message, to be applied by the publish/subscribe broker system, and/or control of the use of the message, to be applied by a subscribing system. The publishing system further includes a publishing component for publishing the message with the associated metadata.

In an embodiment, the metadata creation component may include a look up marker component configured for causing a look up action to retrieve information for about a subscriber, such that control or use of a message varies across subscribers based on the looked up information for each subscriber.

In an embodiment, the publishing system may further include an update subscribing component for subscribing to updates of the message provided by subscribing systems. These updates may include associated metadata provided by subscribing users.

According to embodiments, a fourth aspect of the present invention includes a system for control of messages in a publish/subscribe system. The system is either a publish/subscriber broker system or a subscribing system. The system includes a message receiving component for receiving a published message with associated metadata. The associated metadata defines control of the publishing of the message, to be applied by a publish/subscribe broker system, and/or defines control of the use of the message, to be applied by a subscribing system. The system further includes a metadata analyzing component for analyzing the metadata associated with the message with respect to a subscriber. The system further includes a metadata applying component for applying, based on the analyzing, restrictions to the delivery of the message to the subscriber or use of the message by the subscriber.

In one embodiment, the system is a publish/subscriber broker system. The associated metadata is applied by the publish/subscribe broker system to define control of the publishing of the message. The restrictions are applied to the delivery of the message to the subscriber.

In another embodiment, the system is a subscribing system. The associated metadata is applied by the subscribing system to define control of the use of the message at the subscribing system. The restrictions are applied to the use of the message by the subscriber.

In an embodiment, the analyzing the metadata may include identifying a look up marker and carrying out a look up action to retrieve the information for the look up marker, such that control or use of the message varies across subscribers based on the looked up information for each subscriber.

In an embodiment, the metadata analyzing component may further include a subscriber information obtaining component for obtaining details of the subscriber and applying the metadata to the subscriber.

In an embodiment, the system may be in the form of the publish/subscribe broker system. The system may further include a metadata forwarding component for forwarding at least a subset of the metadata associated with the message to a subscriber. At least some of the at least the subset of the metadata defines control of the use of the message by the subscriber, when applied by a subscribing system.

In an embodiment, the system may be in the form of the subscribing system. The system may further include a message amending component for amending the message, amending the metadata, and re-publishing the amended message and amended metadata to the message publisher.

According to embodiments, a fifth aspect of the present invention includes a computer program product for control of messages in a publish/subscribe system. The computer program product includes a computer readable storage medium having program instructions embodied therewith. The program instructions are executable by a processor to cause the processor to perform several actions. These actions may include: creating a message for publishing to multiple subscribers via a publish/subscribe broker system; providing metadata associated with the message, wherein the metadata defines control of the message, wherein the metadata is to be published with the message, and wherein the metadata relates to control of the publishing of the message to a subscriber, to be applied by the publish/subscribe broker system, and/or control of the use of the message by the subscriber, to be applied by a subscribing system; and publish the message with the metadata.

According to embodiments, a sixth aspect of the present invention includes a computer program product for control of messages in a publish/subscribe system. The computer program product includes a computer readable storage medium having program instructions embodied therewith. The program instructions are executable by a processor to cause the processor to perform several actions. These actions may include: receiving a published message with associated metadata defining control of the publishing of the message, to be applied by a publish/subscribe broker system, and/or defining control of the use of the message, to be applied by a subscribing system; analyzing the metadata associated with a message with respect to a subscriber; and applying, based on the analysis, restrictions to the delivery of the message to the subscriber and/or use of the message by the subscriber.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which:

FIG. 3C is block diagram of an example embodiment of a subscribing system, in accordance with embodiments of the present invention.

Figure 1:
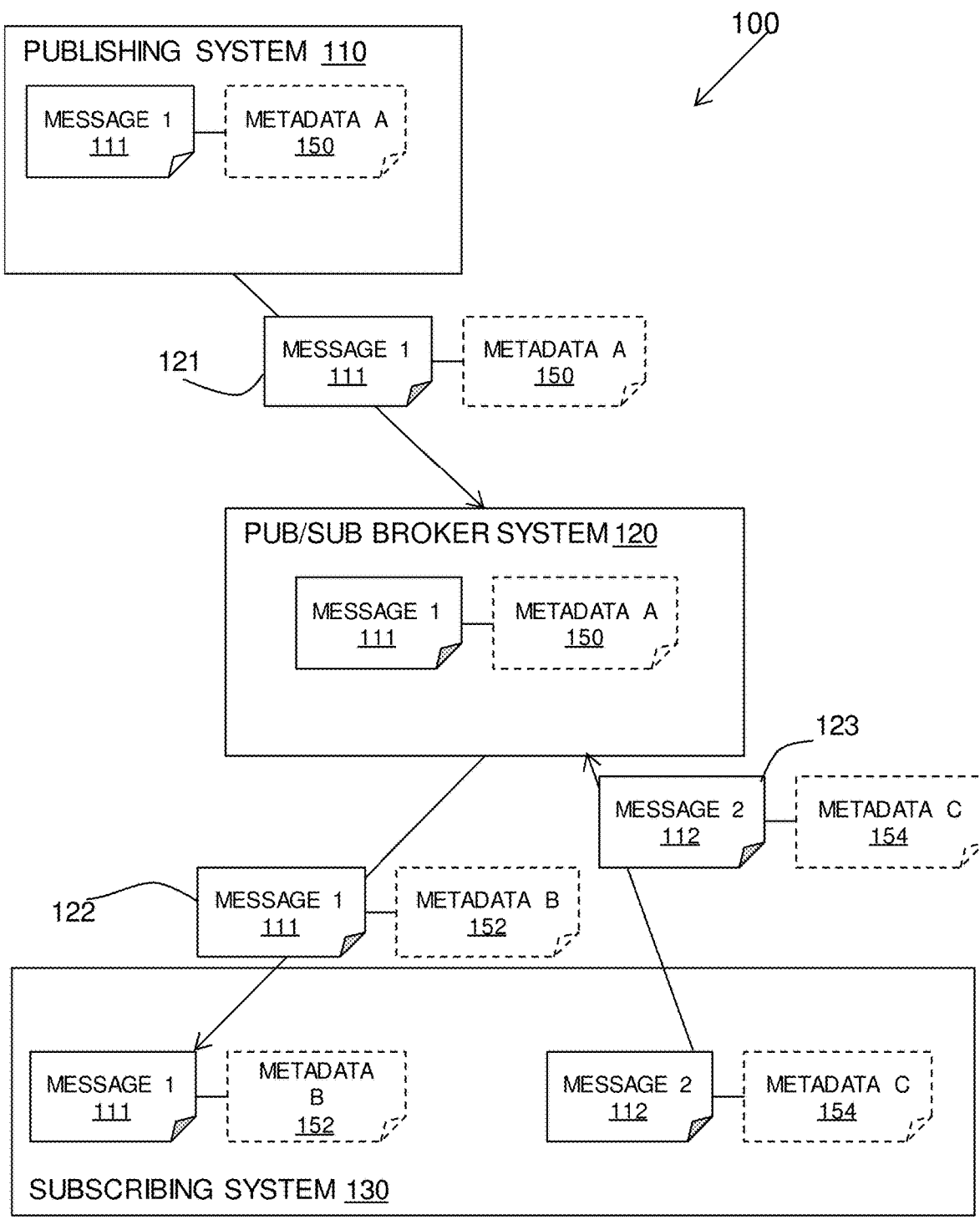
FIG. 1 is a schematic diagram of a publish/subscribe system in which embodiments of the present invention may be implemented.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Embodiments of described methods and systems may provide a publish/subscribe system that holds metadata for messages. When a message is published, associated metadata for it is sent to the system. This metadata may contain information that allows the system to control both the publishing side as well as the subscribing side.

Some or all of the metadata may be sent to the subscriber along with the message so that it can be used by the subscriber side to control how and when the message is actually available. The subscriber end can also look at the metadata to determine if it can alter the message information and send it back to the system to be re-published.

According to embodiments, in the initial publish/subscription phase, the described methods and systems control what is available for publish and subscription based on metadata that is associated with the message. A message is only published at a given time, for a certain time, or the message can only be subscribed to from a certain location, etc.

According to embodiments, in the subscribed phase, the described methods and systems may control the use and retention of a message using metadata associated with it. A message may have been successfully subscribed to and the message sent to the subscriber, but if the subscriber has moved location or their local time is passed a set time then the message may be removed.

The subscriber may also be able to mark a message as edited and send edited message with corresponding metadata back to the system indicating that the original message needs to be updated.

According to embodiments, the described system for controlling a publish/subscribe messaging system includes a publishing system publishing a message including a metadata portion. The metadata portion may include control information on the message as well as on the metadata itself such as the access scope for the metadata.

According to embodiments, a publish/subscribe broker system handles the subscription of subscribing users to published messages. The broker system may analyze the metadata and may forward messages to subscribing applications based on the control information in the metadata.

According to embodiments, a subscribing application may receive a message from the broker system including all or part of the metadata for the message. The subscribing system may also analyze the metadata to determine actions that can be performed on the message. The subscribing application may be allowed to alter the message information and send it back to the system to be re-published, including updated metadata.

According to embodiments, the metadata used by the publish/subscribe broker and/or the subscribing system may include a look up marker or placeholder for a look up action which looks up information which is applied by the metadata. The information may be looked up from various sources such as an external service, from a subscriber end, or by a call back to the broker. The metadata may also use other metadata which has been defined.

Referring to FIG. 1, a schematic diagram illustrates the described method and system, in accordance with an embodiment. A publish/subscribe system 100 includes a publishing system 110, a publish/subscribe broker system 120, and a subscribing system 130. There may be multiple publishing systems 110 and subscribing systems 130 and a publishing system 110 may also include the functionality of a subscribing system 130 or vice versa making an entity both a publisher and a subscriber in the system.

A publishing system 110 may create a message 111 and may define associated metadata 150. The metadata 150 may relate to control of the publishing of the message 111 and to control of the subscribing to the message 111. The metadata 150 may hold information on the message 111 as well as on the metadata itself.

The publishing system 110 may publish (at 121) the message 111 with the associated metadata (metadata A) 150 to a publish/subscribe broker system 120. The broker system 120 may analyze the metadata 150 and may apply any of the metadata relating to the publishing of the message 111.

A subscribing system 130 may subscribe to messages, for example, according to content and topic of the messages. The message 111 may be delivered (at 122) to the subscribing system 130 if the broker system 120 determines that any metadata control is met. The delivered message 111 may include all or only a subset of the metadata (metadata B) 152 that applies to the subscribing system 130.

The subscribing system 130 may analyze the received metadata (metadata B) 152 for the message 111 and may apply any control defined in the metadata to the use of the message 111 at the subscribing system 130.

In some embodiments, the subscribing system 130 may be allowed by the metadata to use the message 111 to amend the received message (message 2) 112 and re-publish it (at 123) with defined metadata (metadata C) 154. In such an embodiment, the subscribing system 130 may be considered to be acting as a publishing system.

Figure 2A:
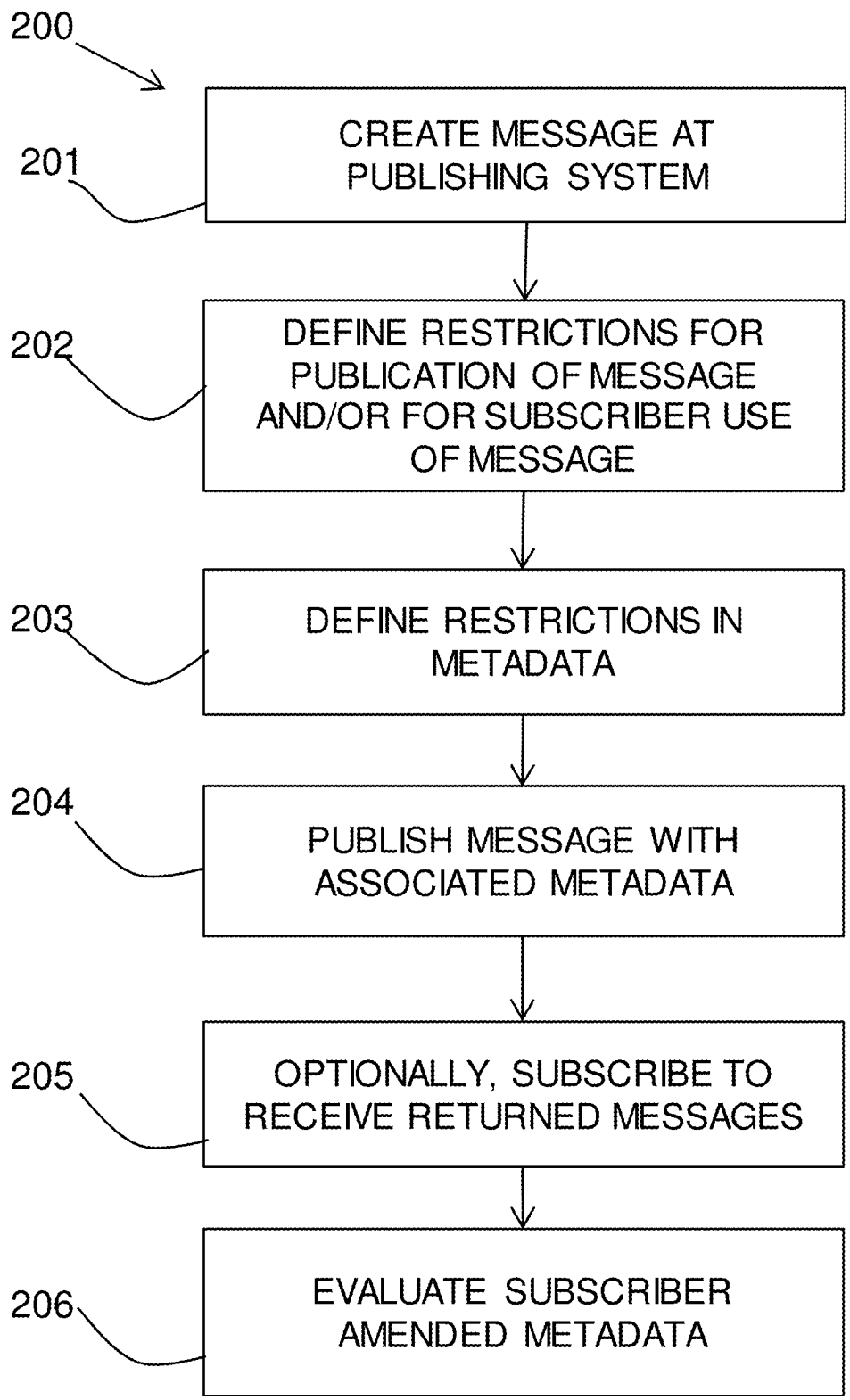
FIG. 2A is a flow diagram of an example embodiment of a method of preparing a message at a publishing system, in accordance with embodiments of the present invention.

Referring to FIG. 2A, a flow diagram 200 shows an example embodiment of an aspect of the described method as carried out at a publishing system, in accordance with embodiments.

A message may be created 201 at a publishing system. Restrictions providing control of the message may be defined 202 including restrictions for publication of the message and/or restrictions for use of the message by subscribers to the message.

Metadata may be provided 203 in association with the message and the message may be published 204 with the associated metadata.

The publishing user may define the metadata, which includes restrictions in publish/subscribe as well as for control of the message after it is received at a subscribing system. The publisher may also determine which information is accessible/seen by the subscriber user. The metadata may be provided in structured data format and sent with the message. Metadata on the message as well as access information on the metadata itself may be formatted data, which may be stored and sent in text, compressed, and/or encrypted format.

The method may optionally include the publishing system subscribing 205 to receive returned messages, in which case any subscriber amended metadata may be evaluated 206 and used to control the returned messages.

Figure 2B:
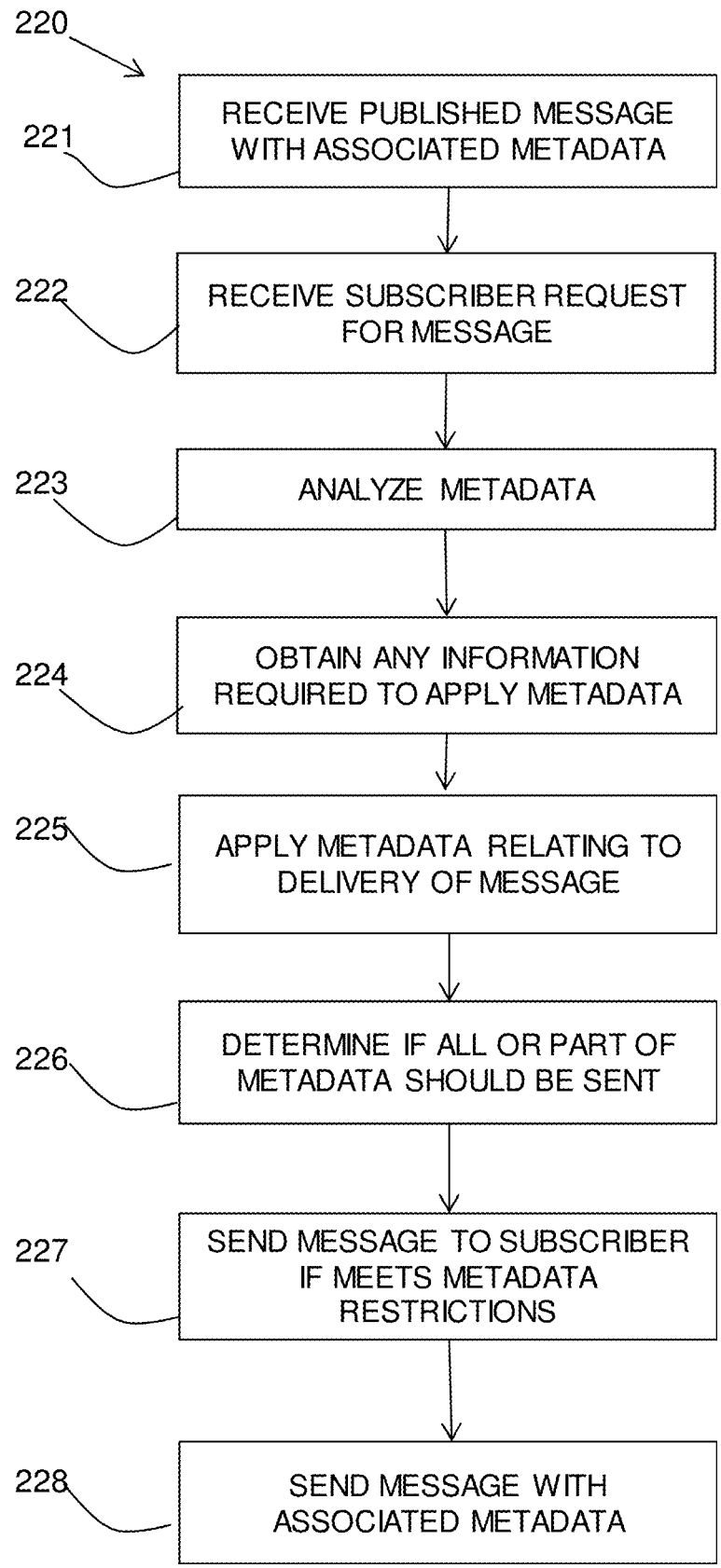
FIG. 2B is a flow diagram of an example embodiment of a method for controlling the transfer of messages at a publish/subscribe broker system, in accordance with embodiments of the present invention.

Referring to FIG. 2B, a flow diagram 220 shows an example embodiment of an aspect of the described method as carried out at a broker system, in accordance with embodiments.

A published message with associated metadata may be received 221 at a broker system. Subscriber requests for messages may also be received 222 and handled by the broker system. Metadata associated with messages may be used by the broker system to control the delivery of the messages.

The metadata of a message may be analyzed 223. Optionally, information required to apply the metadata data may be obtained 224 relating to subscribers. The metadata may include a look up marker that requires information to be acquired and applied. For example, a look up marker may require a location of the subscribing system and the location of subscribers may be determined.

When the subscriber subscribes, they send information on which messages they require, for example, on topics. They also send metadata that describes them, for example, the location they are at, the time at that location, their role, etc. This information is then analyzed to see if it satisfies the restrictions in the messages in the broker. The message's metadata is matched with the subscriber's metadata.

Subscriber criteria may be provided by a login or registration process of a subscriber to the message service provided by the broker system. The subscriber information provided at registration or in the subscriber's profile, for example, gender, age, etc., may be used in conjunction with information derived from the subscriber's system, such as time, location, etc., and will be packaged up as metadata for the subscriber and sent to the broker when the subscriber subscribes.

Metadata relating to a message may be applied 225 to control the delivery of the message to a subscribing system. It may be determined 226 if all the metadata as published with the message should be forwarded to the subscribing system, or only a sub-set of the metadata which applies to the subscribing system.

The message may be delivered 227 to the subscribing system if it meets the metadata restrictions. The message may be delivered 228 with the associated metadata or a sub-set of the metadata.

Figure 2C:
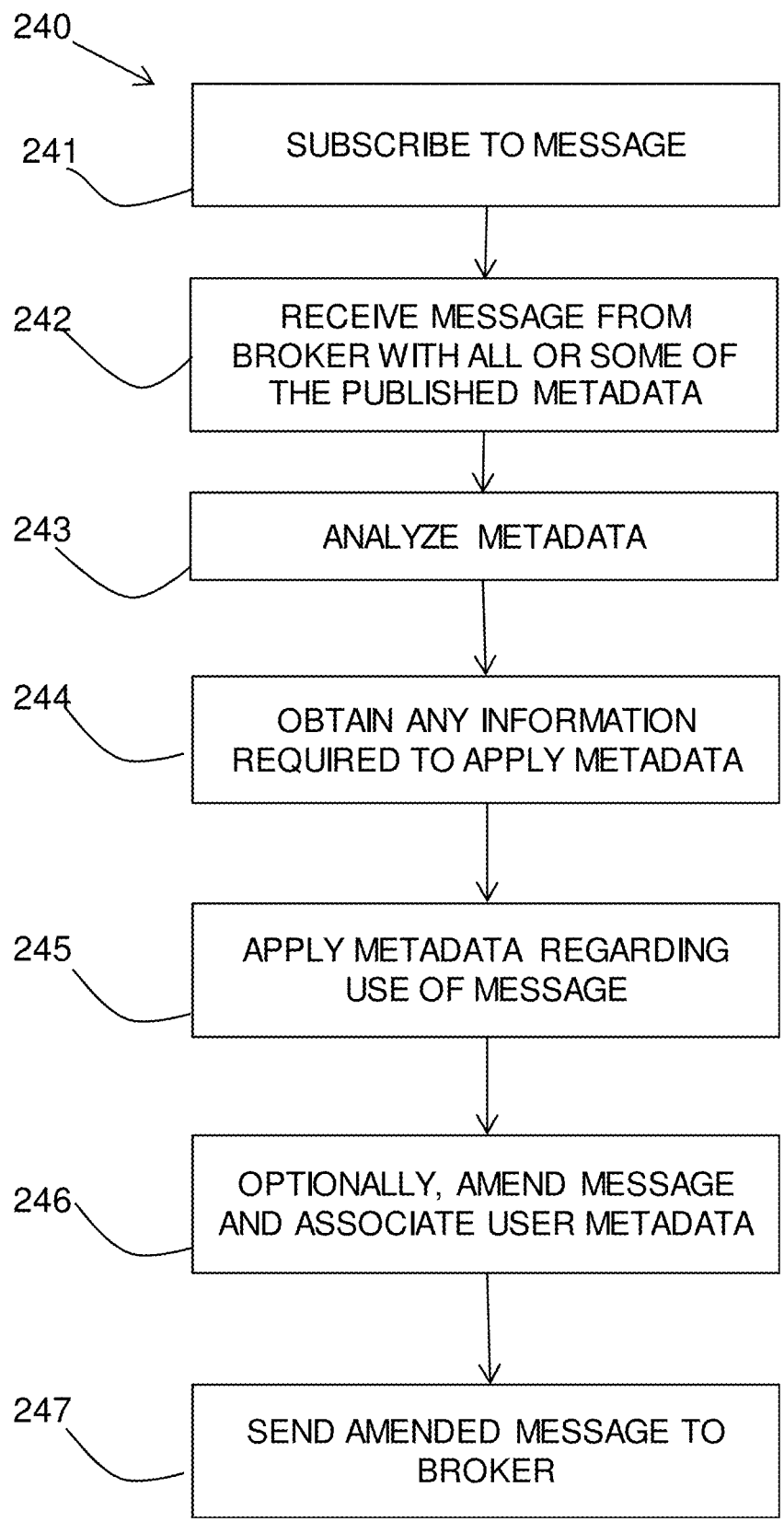
FIG. 2C is a flow diagram of an example embodiment for using a method at a subscribing system, in accordance with embodiments of the present invention.

Referring to FIG. 2C, a flow diagram 240 shows an example embodiment of an aspect of the described method as carried out at a subscribing system, in accordance with embodiments.

A subscribing system may subscribe to a message 241 or a group of messages meeting defined criteria as is well known in the art. For example, such subscription may be based on topics or content.

A message may be received 242 from a broker system together with all or some of the published metadata providing control of the use of the message by the subscribing system.

The received metadata may be analyzed 243 and any information required to apply the metadata may be obtained 244 from the subscribing system itself or from external sources. For example, the metadata may include a look up marker that requires a current location of the subscribing system as the message may relate to the location of the subscribing system and this may be ascertained using location services. The metadata may be applied 245 regarding the use of the message.

Optionally, the subscribing system may be allowed by the metadata to amend 246 the message, for example updating it, and may associate its own or amended metadata to the message. The amended message and associated metadata may be sent 247 to the broker system. In this way the subscribing system may act as a publishing system.

The metadata associated with a published message holds information on the message as well as on the metadata itself such as the access scope for the metadata. The metadata may relate to the publication of the message which may be applied by the broker system, and/or may relate to the use of the message by a subscriber in which case it may be applied by the subscribing system.

The metadata may be categorized into, among others, the following different types.

Date/Time

The date/time property may hold one or more dates and/or times to signify when a message is available. Availability means a broker system may look at the 'Headline' information to advertise to subscribers. Hence, when the start time is met, a new topic may be available.

Availability may also mean that from that time the message can be sent to subscribers or it should stop any further notifications.

On the subscriber side, it controls the range in which the message may be retained by the subscribing system.

The property can be specified as START or END, and can hold multiple pairs of start-end to specify disparate ranges.

The property may be specified as a look up marker, which specifies special times/dates that the system has defined. For example, PUBLIC_HOLIDAY or SCHOOL_TERM_BREAKS markers may be provided. Rather than specifying a list of ranges that specify school term breaks, it will hold the marker SCHOOL_TERM_BREAKS. The date range for the markers may be looked up and therefore can be different in different locations of the subscribers. If this metadata is sent to the subscriber as part of the message, depending on where that subscriber is located, the range is different for them.

In this example, a message may be received and retained at a subscribing system during a school term break, but will not be available if the time is outside that range.

The ability to specify look up markers that can be replaced with information relevant to the subscriber provides increased flexibility and scope for messages. For example, SCHOOL_TERM_BREAKS has different meaning in different locales.

Location Area

The location area property may hold one or more location areas where the message is valid. Only when the subscriber is in that location and remains in that location will the message be available. The property may be specified as coordinates that specify an area.

Availability may be the same as defined above for time/date.

It may be specified as a look up marker that has definitions of an area. A marker could be as simple as US or UK.

Location Info

This information may contain one or more pieces of information relating to specific location area, or in general.

For example, the property could be specified as WEATHER and the value to be met is DRY, or TEMP is WARM. The system may look up the current status of the weather from an online meteorology office for the location of the subscriber. The property will be met if the current status of the weather matches.

Message Information

This property may be the version of the message, such that different versions of a message will be available/sent depending on the matching metadata.

This property may be a relationship graph to other messages. The relationship graph may be parent/child, topic, or other metadata such as other topics.

If a relationship graph exists, the subscriber may receive all the messages in the relationship.

The information may contain other information such as size, message type (text, binary etc.).

Message Access Scope

This property may contain a data access scope for the message. The message may be read-only or editable by the subscriber. If it is editable, the subscriber can send feedback on the message. This data may be used to update the message. If it is editable, the access scope may also specify one or more metadata filter.

For example, EDITABLE=Subscriber filter information: AGE_RANGE, Location:US

A subscriber can send feedback information if they are in the US and meet that age range.

Subscriber Filter Information

This property may control which type of subscribers the message is available for. The criteria may be marked as age range, gender, spoken language, roles, etc.

Availability of the message is similar to that described for time/date, i.e., availability at subscription time as well as after.

For instance, a message about a male youth football league schedule may be set to 'Gender' as 'Boys' in the 'Age range' of '12-18'. Only subscribers that meet those criteria will be able to subscribe. If a subscription has occurred and the subscriber then no longer satisfies the criteria, then it will no longer be available.

Metadata Access Scope

This property may contain the access scope of the metadata.

This defines for each type of metadata, whether it is enabled for use by the publisher, subscriber, both or none. If the metadata type is set to NONE, it is not used. If it is set to PUBLISHER, it is only used on the publishing end. If it is set to SUBSCRIBER, it is pushed to the subscriber and setting to BOTH allows both ends to use it.

For example, TimeDate=SUBSCRIBER

Headline Information

This property may contain information on the topics that this message will belong to.

The property can be marked as TOPIC, ALIAS, and TAG, e.g., TOPIC=Football, ALIAS=Soccer, TAG=Sport, Ball The broker system may advertise the topics. Subscribers may subscribe to topics like a topic-based system, but they can also specify other metadata like a content-based system, such that they can specify aliases or tags.

General

With the control that the metadata provides and the feedback ability, subscribers may be able to subscribe to a topic and yet each subscriber may get completely different messages or different versions of a message depending on that subscriber's particular time, location, or condition of location. A subscriber may send information back for a message and the system may update the original and re-publish. The described method may allow multiple retained messages to be stored on a single topic.

The method may also allow the subscriber to have control of the messages they receive, rather than just the publisher controlling what is available in the broker's message repository for publishing.

Also, in embodiments, the method does not need any new messages to be published and received by the subscriber/publisher to control their messages. All metadata has already been received with the original message.

The method may enable subscribers to provide as feedback to the broker information about themselves and their messages. It also provides information that may allow the broker to control messages based on subscriber feedback and may allow subscribers to control messages based on metadata about themselves and metadata about the message. This provides the ability for subscriber-broker interaction.

Figure 3A:
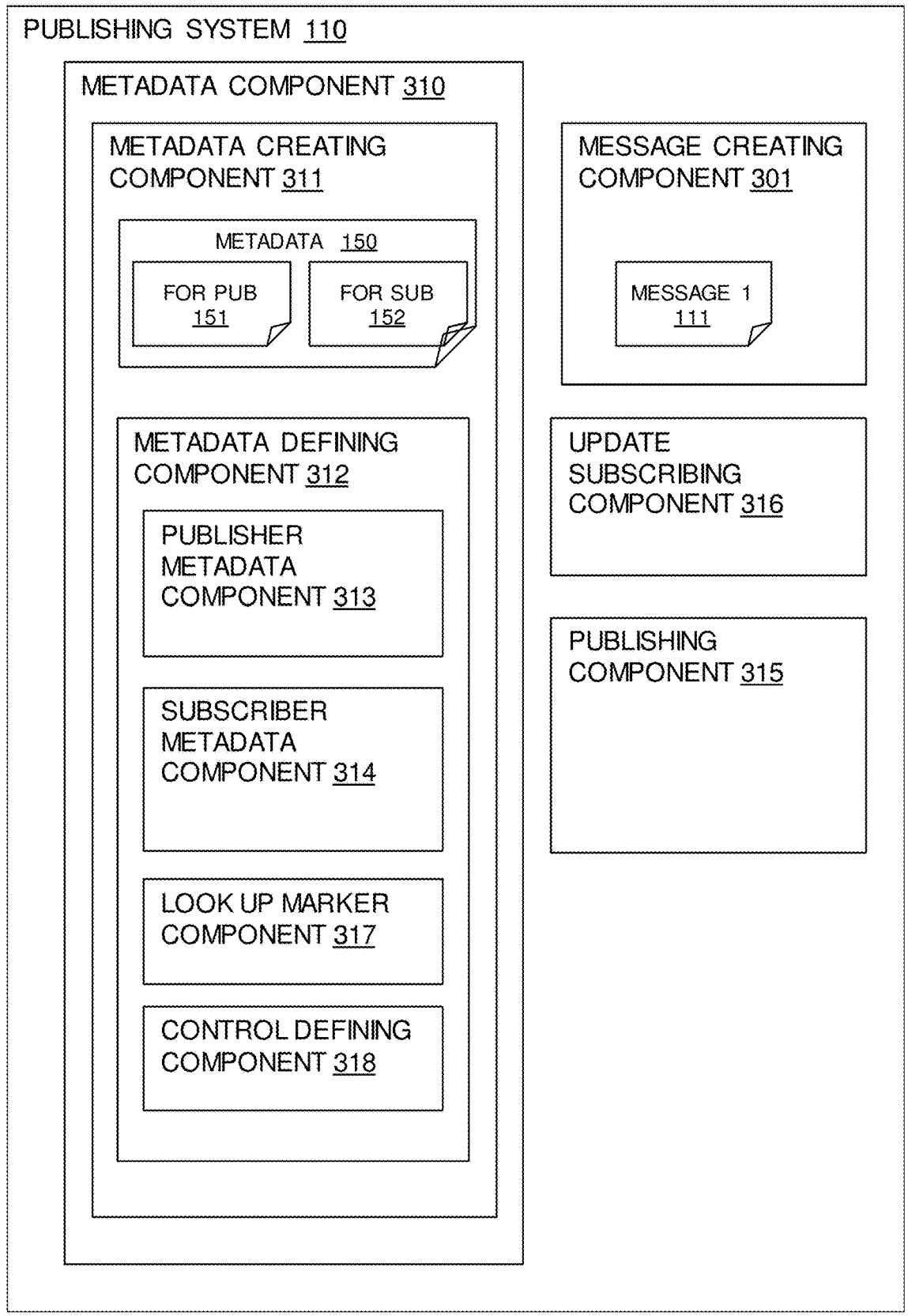
FIG. 3A is block diagram of an example embodiment of a publishing system, in accordance with embodiments of the present invention.

Referring to FIG. 3A, a block diagram shows an example embodiment of a publishing system 110 of a publish/subscribe system, in accordance with embodiments. The publishing system 110 includes a message creating component 301 for creating messages 111.

An embodiment of the described system adds the functionality of a metadata creating component 311 and a metadata defining component 312 within a metadata component 310. The metadata creating component 311 allows for the creation of metadata 150 associated with a message 111 defining control of the message 111. The metadata 150 may include metadata for publishing 151 which relates to control of the publishing of the message 111 to be applied by the publish/subscribe broker system. The metadata 150 may also or alternatively include metadata for the subscriber 152 for control of the use of the message 111 to be applied by a subscribing system.

An embodiment of the metadata defining component 312 may include a publisher metadata component 313 for defining the metadata for publishing 151 and a subscriber metadata component 314 for defining the metadata for subscribers 152. The metadata defining component 312 may include control defining component 318 for defining various controls in the metadata as discussed above. The metadata defining component 312 may also include a look up marker component 317 for defining the control via use of markers which have different applications depending on features of subscribers, such as location.

An embodiment of the publishing system 110 may include a publishing component 315 for publishing the message 111 together with the metadata 150.

An embodiment of the publishing system 110 may also include an update subscribing component 316 for subscribing to re-published updated messages with associated amended metadata. In this way, the publishing system 110 may also act as a subscribing system 130 and may include the components described in relation to FIG. 3C below.

Figure 3B:
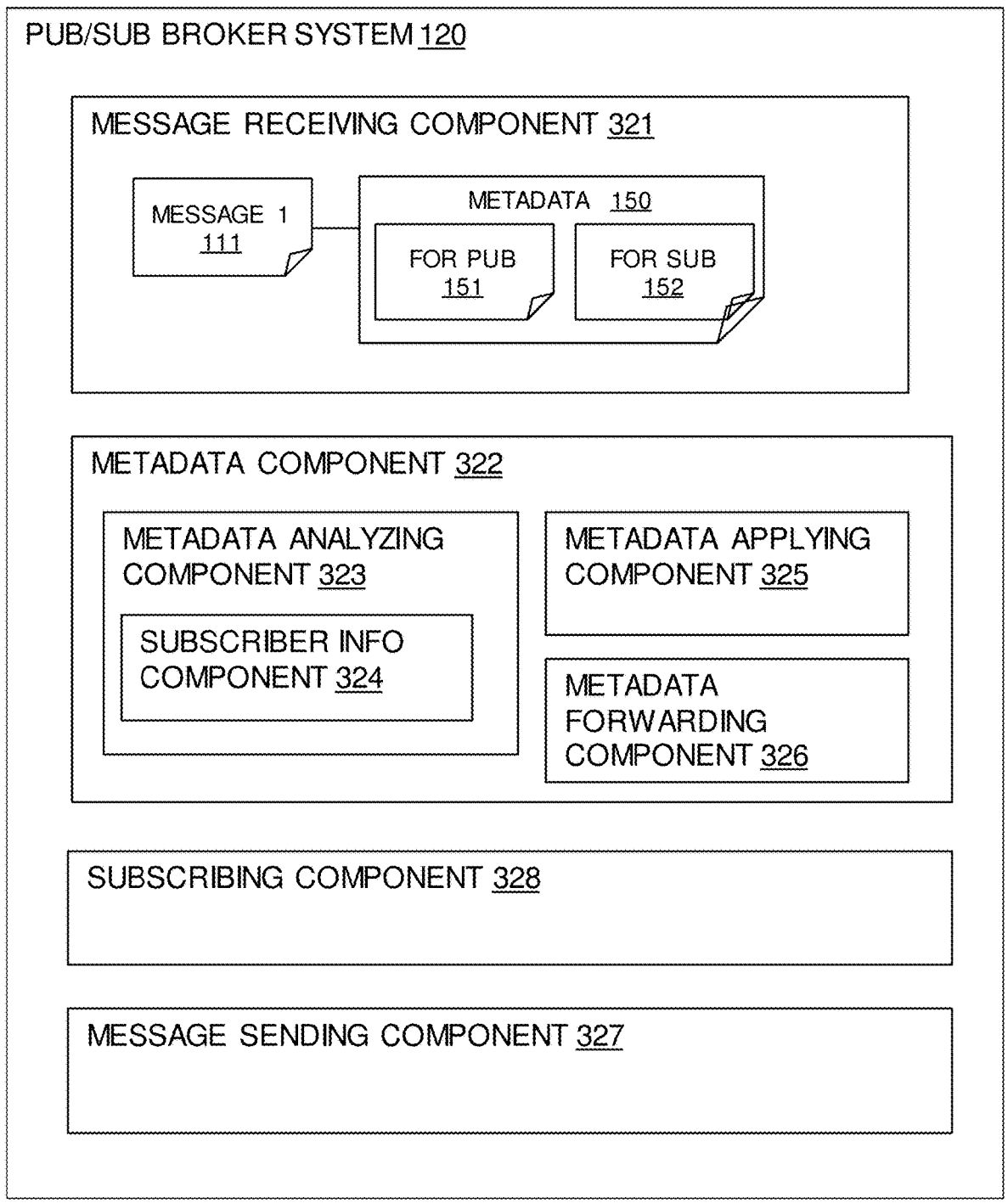
FIG. 3B is block diagram of an example embodiment of a publish/subscribe broker system, in accordance with embodiments of the present invention.

Referring to FIG. 3B, a block diagram shows an example embodiment of a broker system 120 of a publish/subscribe system, in accordance with embodiments.

An embodiment of the broker system 120 may include a message receiving component 321 for receiving a published message for publishing to multiple subscribers who are registered via a subscribing component 328. The subscribing component 328 uses known methods for message subscriptions including topic and content filtering of messages for delivery to subscribing systems. The subscribing component 328 may register subscriber metadata information which may be used by the publish/subscribe broker system 120 when applying associated metadata of a message.

An embodiment of the message receiving component 321 receives a published message 111 with associated metadata 150 provided by the publisher. The metadata 150 may include metadata relating to the publication 151 of the message 111 and/or metadata relating to the use of the message by subscribers 152. The metadata 150 itself may define the use of the metadata, e.g., during publishing or during use once received by a subscribing system.

A metadata component 322 of the broker system 120 may extract any metadata 151 which relates to the publication of the message 111. A metadata analyzing component 323 may analyze the metadata and a subscriber information component 324 may retrieve any required information relating to subscribers that is required to apply the publication controls provided by the metadata, including as required for applying look up markers in the metadata.

The metadata component 322 may also include a metadata applying component 325 for applying the publication controls specified in the metadata to the message 111. A metadata forwarding component 326 may forward metadata 152 relating to the control of the use of the message 111 by subscribers with the message 111.

The broker system 120 may include a message sending component 327 for forwarding a message 111, with either all the metadata 150 or the metadata 152 relating to the control of the use by the subscriber, to a subscribing system.

Referring to FIG. 3C, a block diagram shows an example embodiment of a subscribing system 130 of a publish/subscribe system, in accordance with embodiments.

An embodiment of the subscribing system 130 may include a subscribing component 338 for subscribing to messages published by a publishing systems 110 via a publish/subscribe broker system 120.

An embodiment of the message receiving component 331 may receive a message 111 with associated metadata 150 provided by the publisher. The metadata 150 may include metadata 151 relating to the publication of the message 111 which may have already been used by the broker system 120. The metadata 150 may also include metadata 152 relating to the use of the message by the subscribing system 130.

An embodiment of the metadata component 332 at the subscribing system 130 may include a metadata analyzing component 333 for analyzing the metadata 152 relating to the use of the message 111 by the subscriber. A subscriber information component 334 may retrieve information relating to the subscriber which may be required to apply the metadata to the message 111, including as required for applying look up markers in the metadata. A metadata applying component 335 may apply the controls defined in the metadata 152 to the use of the message 111.

In one embodiment, the subscribing system 130 may include a message re-publishing component 336 for the subscriber to amend the message 111 using a message amending component 337 and amend the associated metadata using a metadata amending component 339 and re-publishing the message to the broker system 120 for return to a publishing system 110. In this way, the subscribing system 130 may also act as a publishing system 110 and may include the components described in relation to FIG. 3A above.

Figure 4:
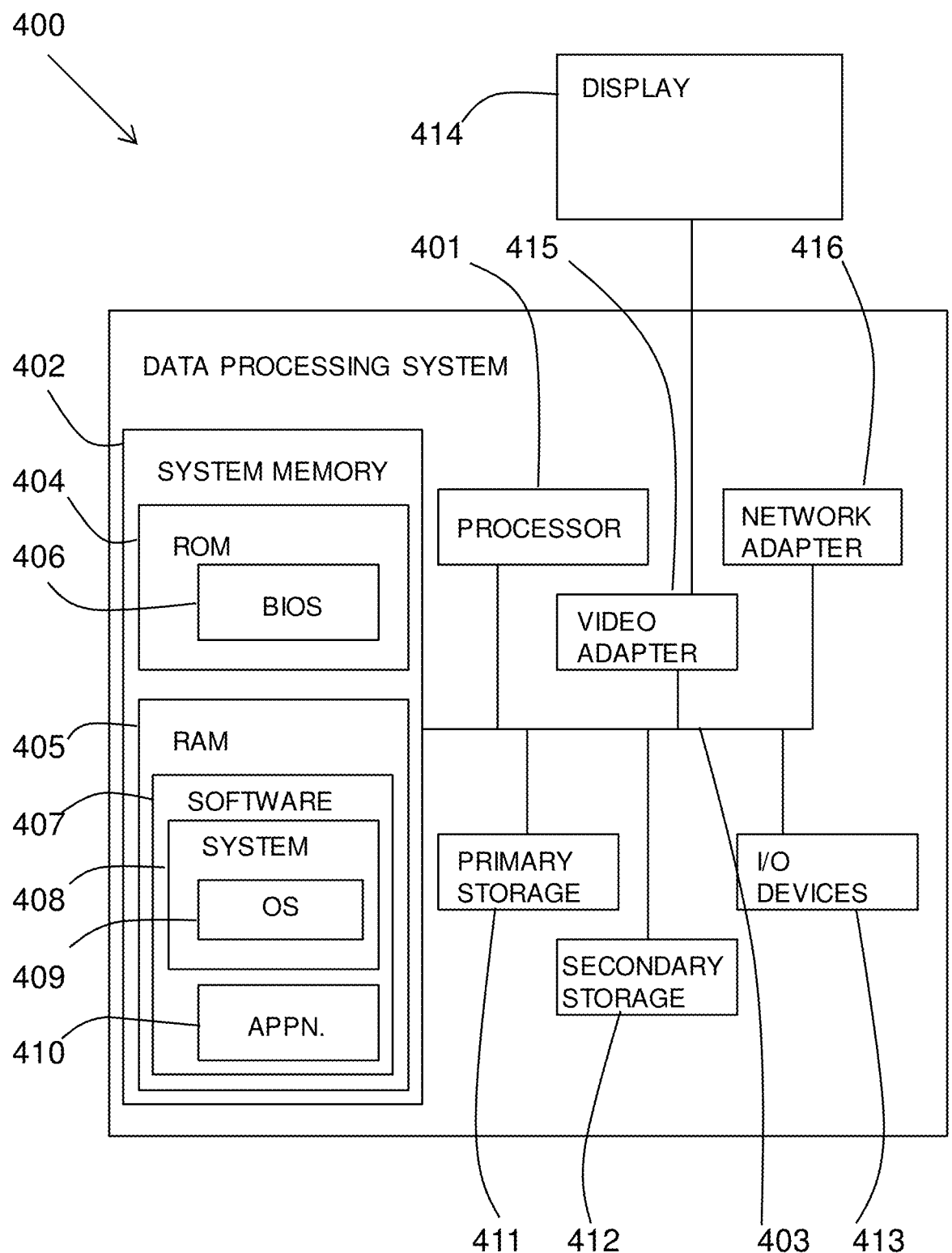
FIG. 4 is a block diagram of an embodiment of a computer system in which embodiments of the present invention may be implemented.

Referring to FIG. 4, an exemplary system for implementing aspects of embodiments of the invention includes a data processing system 400 suitable for storing and/or executing program code. The data processing system 400 may include at least one processor 401 coupled directly or indirectly to memory elements through a bus system 403. The memory elements may include local memory employed during actual execution of the program code, bulk storage, and cache memories which provide temporary storage of at least some program code in order to reduce the number of times code must be retrieved from bulk storage during execution.

The memory elements may include system memory 402 in the form of read only memory (ROM) 404 and random access memory (RAM) 405. A basic input/output system (BIOS) 406 may be stored in ROM 404. Software 407 may be stored in RAM 405 including system software 408 such as operating system software 409. Software applications 410 may also be stored in RAM 405.

The system 400 may also include a primary storage means 411 such as a magnetic hard disk drive and secondary storage means 412 such as a magnetic disc drive and an optical disc drive. The drives and their associated computer-readable media provide non-volatile storage of computer-executable instructions, data structures, program modules and other data for the system 400. Software applications may be stored on the primary and secondary storage means 411, 412 as well as the system memory 402.

The computing system 400 may operate in a networked environment using logical connections to one or more remote computers via a network adapter 416.

Input/output devices 413 may be coupled to the system either directly or through intervening I/O controllers. A user may enter commands and information into the system 400 through input devices such as a keyboard, pointing device, or other input devices (for example, microphone, joy stick, game pad, satellite dish, scanner, or the like). Output devices may include speakers, printers, etc. A display device 414 is also connected to system bus 403 via an interface, such as video adapter 415.

In an embodiment, the data processing system 400 may be a publish/subscribe system. Further, in an embodiment, the data processing system 400 may be a publishing system, a subscribing system, and/or a publish/subscribe broker system.

In an embodiment, the data processing system 400 may be a publishing system for control of messages in a publish/subscribe system. The publishing system may include a memory. The publishing system may also include a processor communicatively coupled to the memory. The processor may include at least one processor circuit that is configured to perform, based instructions obtained from the memory, a method comprising: creating a message for publishing to multiple subscribers via a publish/subscribe broker system; providing metadata associated with the message, wherein the metadata defines control of the message, wherein the metadata is to be published with the message, and wherein the metadata relates to control of at least one of a group of actions consisting of publishing of the message to a subscriber, as applied by the publish/subscribe broker system based on the metadata, and use of the message by the subscriber, as applied by a subscribing system based on the metadata; and publishing the message with the metadata.

In an embodiment, the data processing system 400 may be a subscribing system for control of messages in a publish/subscribe system. The subscribing system may include a memory. The subscribing system may also include a processor communicatively coupled to the memory. The processor may include at least one processor circuit that is configured to perform, based instructions obtained from the memory, a method comprising: receiving a published message with associated metadata defining control of at least one of a group of actions consisting of the publishing of the message, to be applied by a publish/subscribe broker system, and the use of the message, to be applied by a subscribing system; analyzing the metadata associated with a message with respect to a subscriber; and applying, based on the analysis, restrictions to at least one a group of actions consisting of delivery of the message to the subscriber and use of the message by the subscriber.

In an embodiment, the data processing system 400 may be a publish/subscribe broker system for control of messages in a publish/subscribe system. The publish/subscribe broker system may include a memory. The publish/subscribe broker system may also include a processor communicatively coupled to the memory. The processor may include at least one processor circuit that is configured to perform, based instructions obtained from the memory, a method comprising: receiving a published message with associated metadata defining control of at least one of a group of actions consisting of the publishing of the message, to be applied by a publish/subscribe broker system, and the use of the message, to be applied by a subscribing system; analyzing the metadata associated with a message with respect to a subscriber; and applying, based on the analysis, restrictions to at least one a group of actions consisting of delivery of the message to the subscriber and use of the message by the subscriber.

As used herein, a set of may mean one or more.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A method for allowing a corresponding publishing user to maintain fine-grain control of a message throughout an entire publish/subscribe architecture and for an entire useful life of the message, the method comprising:
   creating the message and metadata associated with the message, wherein the metadata, as selected by the corresponding publishing user, includes an event marker associated with a public event that occurs at different date ranges in different geographic locations such that the event marker is capable of defining the fine-grain control of the message in the form of date range restrictions on use of the message to be applied differentially by a plurality of subscribing systems in the publish/subscribe architecture; and
   publishing the message with the associated metadata to the plurality of subscribing systems,
   wherein the receipt of the published metadata with the event marker at each subscribing system causes that subscribing system to look up the date range of the public event at its geographic location and restrict the use of the message by its corresponding subscribing user based on that date range such that fine-grain control of the message is maintained by the publishing user.

2. The method of claim 1, further comprising:
   subscribing, by the system and upon selection by the corresponding publishing user, to updates of the message created by the subscribing users at their corresponding subscribing systems, wherein the updates each incorporate additional associated metadata also created by the subscribing users.

3. The method of claim 1, wherein the event marker is further configured to cause each subscribing system to delete the message responsive to that subscribing system changing its geographic location.

4. The method of claim 1, wherein the restrictions on the use of the message are not settable or adjustable by the subscribing users.

5. The method of claim 1, wherein all of the date ranges of the public event begin after and do not coincide with a date that the message is delivered to the subscribing systems.

6. The method of claim 1, wherein each subscribing system looks up the date range of the public event at its geographic location in an external source that is separate from the publish/subscribe architecture.

7. A method carried out at a broker system in a publish/subscribe architecture, the broker system configured to allow a publishing user to maintain fine-grain control of a message throughout the entire publish/subscribe architecture including through end use of the message by a plurality of subscribing systems, the method comprising:
   receiving the message for publishing to the plurality of subscribing systems and associated metadata, the associated metadata incorporating at least a broker-system-layer-control metadata subset designed to control delivery of the message by the broker system and a subscribing-system-layer-control metadata subset designed to control use of the message by the subscribing systems, wherein both metadata subsets are selected by the publishing user such that the entirety of the associated metadata defines the fine-grain control of the message in the form of restrictions on the message to be applied differentially at multiple layers of the publish/subscribe architecture as well as differentially among the plurality of subscribing systems;
   determining, by the broker system and based on an analysis of the broker-system-layer-control metadata subset, that restrictions on the delivery of the message to each of the subscribing systems varies based on characteristics of the subscribing systems;
   looking up, by the broker system and based on the determination about the broker-system-layer-control metadata subset, the characteristics of each subscribing system;
   applying, by the broker system and based on the looked-up information for each subscribing system, the required restrictions to the delivery of the message to each subscribing system differentially such that the fine-grain control of the message by the publishing user is maintained at the broker-system layer of the publish/subscribe architecture; and forwarding, by the broker system, at least the subscribing-system-layer-control metadata subset to each subscribing system to whom the message is delivered, wherein, based on its analysis of the subscribing-system-layer control metadata subset, each subscribing system differently applies restrictions on the use of the message by its corresponding subscribing user, wherein the restrictions applied by each subscribing system are in addition to the restrictions applied by the broker system such that the fine-control of the message by the publishing user is also maintained at the subscribing-system-layer of the publish/subscribe architecture.

8. The method of claim 7, wherein upon selection by the corresponding publishing user, the publishing user subscribes to updates of the message created by the subscribing users at their corresponding subscribing systems, wherein the updates each incorporate additional associated metadata also created by the subscribing users, and wherein the updates are delivered to the publishing user in accordance with the additional associated metadata and via the broker system.

9. The method of claim 7, wherein the restrictions on the delivery of the message are based on a current location and a time at that current location for each of the subscribing systems.

10. The method of claim 7, wherein neither the restrictions on the delivery of the message nor the restrictions on the use of the message are not settable or adjustable by the subscribing users.

* * * * *